(12) United States Patent
Shinnar

(10) Patent No.: US 8,544,275 B2
(45) Date of Patent: Oct. 1, 2013

(54) APPARATUS AND METHOD FOR STORING HEAT ENERGY

(75) Inventor: Reuel Shinnar, Great Neck, NY (US)

(73) Assignee: Research Foundation of the City University of New York, New York, NY (US)

( * ) Notice: Subject to any disclaimer, the term of this patent is extended or adjusted under 35 U.S.C. 154(b) by 734 days.

(21) Appl. No.: 12/340,384

(22) Filed: Dec. 19, 2008

(65) Prior Publication Data

US 2009/0178409 A1     Jul. 16, 2009

Related U.S. Application Data

(63) Continuation-in-part of application No. 12/066,054, filed as application No. PCT/US2007/074646 on Jul. 27, 2007, now Pat. No. 7,954,321, said application No. 12/066,054 is a continuation-in-part of application No. PCT/US2007/074647, filed on Jul. 27, 2007.

(60) Provisional application No. 60/905,729, filed on Mar. 8, 2007, provisional application No. 60/834,736, filed on Aug. 1, 2006, provisional application No. 61/063,467, filed on Jan. 31, 2008, provisional application No. 61/069,778, filed on Mar. 17, 2008, provisional application No. 61/069,779, filed on Mar. 17, 2008, provisional application No. 61/097,043, filed on Sep. 15, 2008, provisional application No. 61/083,005, filed on Jul. 23, 2008, provisional application No. 61/083,051, filed on Jul. 23, 2008, provisional application No. 61/086,055, filed on Aug. 4, 2008, provisional application No. 61/115,831, filed on Nov. 18, 2008, provisional application No. 61/008,635, filed on Dec. 21, 2007.

(51) Int. Cl.
*F01K 1/00* (2006.01)
*F01K 3/00* (2006.01)
*F28D 17/00* (2006.01)
*F28D 19/00* (2006.01)
*F24J 2/34* (2006.01)

(52) U.S. Cl.
USPC ................................ 60/659; 165/10; 126/617

(58) Field of Classification Search
USPC ...................... 60/659; 165/10; 126/617–620
See application file for complete search history.

(56) References Cited

U.S. PATENT DOCUMENTS 3,977,197 A * 8/1976 Brantley, Jr. ..................... 60/659
4,137,898 A * 2/1979 Koizumi et al. .............. 126/591

(Continued)

FOREIGN PATENT DOCUMENTS

| JP | 61261678 A | 11/1986 |
| JP | 2002031035 A | 1/2002 |
| WO | 0201576 A1 | 1/2002 |

OTHER PUBLICATIONS

Shinnar, R. et al. A Road Map to U.S. Decarbonization, Science vol. 313, pp. 1243-1244 (Sep. 2006).

(Continued)

*Primary Examiner* — Kenneth Bomberg
*Assistant Examiner* — Christopher Jetton
(74) *Attorney, Agent, or Firm* — Burns & Levinosn LLP; Jacob N. Erlich; Orlando Lopez

(57) ABSTRACT

Method and apparatus for storing heat in industrial systems where large sources of stored energy are called upon to meet a work load, storing the heat content of a hot working fluid by using the hot working fluid as a heat transfer fluid in vapor form and depositing its heat content on a heat storage medium and then removing the cooled and condensed liquid phase of that heat transfer fluid, and when hot working fluid again is needed, the liquid heat transfer fluid is returned to the heated storage medium and is reheated as it passes through the hot storage medium and then is returned to the working system to be used as a hot working fluid.

22 Claims, 6 Drawing Sheets

(56) References Cited

U.S. PATENT DOCUMENTS

| | | | |
|---|---|---|---|
| 4,172,491 A * | 10/1979 | Rice | 165/10 |
| 4,192,144 A * | 3/1980 | Pierce | 60/641.8 |
| 4,215,553 A * | 8/1980 | Poirier et al. | 60/650 |
| 4,222,365 A | 9/1980 | Thomson | |
| 4,304,219 A | 12/1981 | Currie | |
| 4,362,149 A | 12/1982 | Thomson | |
| 4,405,010 A * | 9/1983 | Schwartz | 165/4 |
| 4,418,683 A * | 12/1983 | Friefeld et al. | 126/400 |
| 4,433,673 A | 2/1984 | Vierling | |
| 4,463,799 A * | 8/1984 | Takahashi et al. | 165/10 |
| 4,807,696 A * | 2/1989 | Colvin et al. | 165/10 |
| 5,103,802 A | 4/1992 | Thomason | |
| 5,269,145 A | 12/1993 | Krause et al. | |
| 5,448,889 A * | 9/1995 | Bronicki | 60/641.14 |
| 5,867,989 A * | 2/1999 | Platell | 60/659 |
| 2004/0042579 A1 | 3/2004 | Bolton et al. | |
| 2005/0013402 A1 | 1/2005 | Kriel | |

OTHER PUBLICATIONS

Shinnar, R. et al. Solar thermal energy: The forgotten energy source, Technology in Society 29, pp. 261-270 (2007).

Price, H. Executive Summary: Assessment of Parabolic Trough and Power Tower Solar Technology Cost and Performance Forecasts, Sargent & Lundy LLC Consulting Group, NREL/SR-550-35060 (Oct. 2003).

Lewis, N.S. et al. Toward Cost-Effective Solar Energy Use, Science, vol. 315, pp. 798-801 (Feb. 2007).

Shinnar, R. The rise and fall of Luz, Chemtech 23, pp. 50-53 (1993).

Matros Y. SH. et al. Reverse-Flow Operation in Fixed Bed Catalytic Reactors, Catal. Rev., Sci. Eng. 38, pp. 1-68 (1996).

* cited by examiner

APPARATUS AND METHOD FOR STORING HEAT ENERGY

CROSS-REFERENCE TO RELATED APPLICATIONS

The present application claims the benefit of priority of Patent Applications under 35 U.S.C. §119(e) of Ser. No. 61/063,467, filed Jan. 31, 2008, Ser. No. 61/069,778, filed Mar. 17, 2008, Ser. No. 61/069,779, filed Mar. 17, 2008, Ser. No. 61/097,043, filed Sep. 15, 2008, Ser. No. 61/083,005, filed Jul. 23, 2008, Ser. No. 61/083,051, filed Jul. 23, 2008, Ser. No. 61/086,055, filed Aug. 4, 2008, Ser. No. 61/115,831, filed Nov. 18, 2008, Ser. No. 61/008,635, filed on Dec. 21, 2007, the disclosures of which are expressly incorporated by reference herein in their entirety. The present application is also a Continuation-in-Part of application Ser. No. 12/066,054, filed on Mar. 6, 2008 now U.S. Pat. No. 7,954,321, which is the national stage of International Application Ser. No PCT/US07/74646, filed on Jul. 27, 2007, which claims the benefit of priority under 35 U.S.C. 119(e) of Application Ser. No. 60/905,729, filed on Mar. 8, 2007, and is also a Continuation-in-Part of International Application Ser. No. PCT/US07/74647, filed on Jul. 27, 2007, which claims the benefit of priority under 35 U.S.C. 119(e) of Application Ser. No. 60/834,736, filed on Aug. 1, 2006, the disclosures of which are expressly incorporated by reference herein in their entirety.

FIELD OF THE INVENTION

The present invention generally relates to method and apparatus for storing heat energy, and more particularly the present invention relates to method and apparatus for storing heat for use, especially in industrial power systems.

BACKGROUND

There is great need for storage of electricity, or of energy that can generate electricity. In some sense, fossil fuels are stored sunlight. Electro-chemical cells are good for storing energy for later retrieval, for example electro-chemical "batteries", can be used for household items, small appliances and even for electric vehicles. But in size and cost, these are mostly small-scale applications.

But larger power applications cannot be adequately served with electro-chemical storage batteries. These use include storage of power for power plants or for other large machinery to be driven with stored energy. We refer to these as "large-scale" applications or "industrial" applications. In the electric power grid, hydroelectric power is often used to provide stored energy on-demand and enable fast load-following for regulation of grid variations. But these large-scale applications cannot be cost-effectively served with electrochemical storage and yet hydro-electric storage capacity is limited to regions and local conditions. Energy can also be stored as steam. There is a known industrial method for storing steam, done by storing pressurized boiling water in pipes and generating electricity by reducing the pressure, which causes the boiling point to drop and part of the stored steam to evaporate. But this causes a significant loss in free energy as the obtained steam has a lower temperature and pressure, and it is an expensive method with low thermal efficiency. But it works.

Pumped storage, which is similar to hydroelectricity, is widely practiced where the topology allows it but has only moderate efficiency. Compressed air can also be used but it only has moderate efficiency and relatively high costs. None are presently used to meet the large-scale demand in supporting the grid.

Furthermore, it will be understood that load requirements on the grid are large during the day and the early evening and lower at night and on the weekend. This heavy loading in the past was solved by designing power plants that could rapidly change power output without any significant loss in efficiency. In addition to hydroelectric power plants, steam power plants with boiler and turbine with large turndown ratio have that capability. They take time to start up (up to half a day), but they can operate at around 13% of their full capacity and still be at high efficiency and are able to vary their output rapidly for load-following or load-leveling on the grid. However, to be effective, this requires a large over-capacity compared to the average capacity of the plant. This overcapacity in our power system used to be around 1.5 to a factor of 2. But now power plants do not maintain such excess capacity.

The ratio between the maximum capacity and the minimum capacity at which the power plant can operate without a significant loss in efficiency is called the turndown ratio. For conventional coal power plants the design specifications call for a minimum turndown ratio of 8:1. These plants used to be effective providers and regulators of power on the grid, having been provided with adequate over-capacity.

However, demand has grown, and yet new plants have not been built at a rate to keep up with this growth. Rather, excess capacity has simply become part of the regularly used capacity. Furthermore, while today coal power plants are more efficient than fifty years ago, still overall they have become more expensive to operate per kWh, as the need to reduce pollution has increased their cost dramatically.

With this loss of overcapacity come the need to find a source of excess energy to meet peak demand and for use in gird regulation.

Furthermore, at the same time that over-capacity of the grid has substantially decreased, the variability of grid operations has increased dramatically. This has created a severe supply and control crisis. Not only do we have new user technology, like air-conditioning that is more variable in its use and increases load considerably, but we now have new variable generation sources, such as wind turbine, solar cells, and concentrating solar power (CSP), that can cause dangerous swings on the grid.

While CSP power plants are large enough to make it economical and practical to be provided with large-scale storage, most notably molten salt, solar cells and wind cannot. One way to cope with this condition is to build more fast-responding steam power plants, to increase the over-capacity and with fast response for supplying and regulating the grid. But building new power plants is a long process and is very expensive. An alternative solution that can increase capacity and controllability would therefore be welcome.

Another reason for the increased need for storage is that the technology for generating electricity has changed. Nuclear power plants have a much slower response and a low turndown ratio. Combined cycle power plants (CCPP) also have a very low turndown ratio, but for natural gas they have a much higher efficiency (60% versus 37-45% for coal) than any other fossil based power plant and are therefore in use. CCPP technology is based on a high temperature gas turbine, the hot exhaust of which is fed to a boiler creating steam for a steam turbine. These plants provide a large fraction of the electric energy in the world and their use is growing fast (reaching over 20% of installed capacity in the U.S.). The problem is that gas turbines have a very low turndown ratio, losing efficiency very rapidly when power is below maximum. The only control is basically on-off, as they can be shutdown in an hour and started up in one or two hours. But they are not suitable for rapid load following for grid regulation and there is not enough overcapacity to enable such operation as a practical matter.

The same is true for Integrated Gasification Combined Cycle (IGCC) power plants, the only really coal power plants clean enough to be added to the grid today in the US. These are basically combined cycle power plants in which the gas is not natural gas but the product of a coal gasifier. One of IGCC's problems is that its turndown ratio is very low and so is its capability to rapidly load follow is low. Again the need for grid regulation goes unmet.

Therefore, it will be appreciated that there remains a felt need for new energy storage systems that can help address the above supply and control issues. The present invention solves one or more of the problems associated with prior heat storage systems and is directed to these and other uses for stored energy.

SUMMARY OF THE INVENTION

The present invention provides method and apparatus for storing heat, most notably in industrial systems where large sources of stored energy are called upon to meet a work load, such as for driving a turbine in electric power generating plants. The present invention overcomes thermal storage limitations and in fact enables storage of heat at practically any temperature at which most power plants can operate. The present invention is simple in design and is more robust and is relatively less expensive to implement and operate than other methods of heat storage for large-scale applications.

In one illustration, in a system that uses a hot working fluid to do work of the system, such as for working a pump or diving a turbine, for example, wherein the present invention teaches storing the heat content of that hot working fluid by using the hot working fluid as a heat transfer fluid in vapor form and depositing its heat content on a heat storage medium and then removing the now cooled and condensed liquid phase of that heat transfer fluid, perhaps to a holding tank. When hot working fluid again is needed, the liquid heat transfer fluid is returned to the heated storage medium and is reheated as it passes through the hot storage medium and then is returned to the working system and is used as a hot working fluid as needed.

In various embodiments, we teach a systems and methods that provide stored heat using a heat transfer fluid at or about temperature Ta, illustrative systems and methods thereof including: ceramic heat storage medium having an extended longitudinal section extending along a longitudinal axis, the medium formed with particles, the particles cooperating and defining voids between the particles to facilitate flow of a flow of heat transfer fluid in the longitudinal direction, the voids combining to define a longitudinal flow path along the longitudinal axis through the medium; the particles and voids enabling flow of the fluid along a plane perpendicular to the axis laterally across the medium, the particles configured to limit particle-to-particle heat transfer, the particles configured to promote and having an affinity for direct transfer of heat with the fluid in the plane and thus defining a heat front along the plane, wherein the medium and fluid cooperate to transfer heat between the fluid and the medium along the plane to form the heat front perpendicular to the axis and along the plane; the particles simultaneously resisting heat transfer by contact with each other and having an affinity for rapidly transferring heat by direct contact with the fluid; and the flow path having a port for passing a superheated working fluid, the flow path having a region at the port for storing the heat of the superheated working fluid at temperature Ta after the flow is stopped.

Further embodiments include a flow controller, the controller controlling the flow rate of the fluid, wherein the rate is selected to ensure that the particles and the fluid along the plane arrive at temperature Ta while in the plane, the flow path having a port for passing the heated fluid at temperature Ta, the vapor phase of the fluid being used as a working fluid in the system; further including a container for containing the medium and having a heat transfer fluid cool port and heat transfer fluid superheat port, the flow path having a superheat region and a boiling region, in the area of the cool port the flow path carrying the fluid as a liquid below the boiling temperature to the boiling region, the flow path storing the heat of the fluid as a superheated vapor at temperature Ta in the area of the superheat port, and the flow path storing the heat of the fluid as a boiling liquid in the boiling region. In some embodiments the particles further include heat storage material and heat insulating material, further including periodic insulating porous layers of the insulating material in the flow path to prevent at the front the reduction of the temperature gradient by heat conduction through the particles, and wherein preferably the insulating layer is a plate with passages, the plate made of an insulating heat resistant material and may be a layer of insulating heat resistant particles similar in size to the heat conducting material.

In practices of the invention, the flow path has the ability to store the heat of steam generated in a concentrating solar power plant, regenerating this steam by feeding water to the storage vessel, for delivery of the regenerated steam on demand. In various embodiments, this includes the ability to store the heat of steam generated in the steam boiler of a combined cycle power plant whenever the steam is not needed to generate electricity thereafter using the steam stored whenever needed in a separate turbine providing thereby load following capability and storage to a combined cycle plant; or wherein the extra steam turbine is larger than the steam turbine of the plant itself and providing larger short term load following capability to use to stabilize a power grid; or wherein the plant is an integrated coal gasification combined cycle power plant to provide it with better load following capability; or wherein the plant is a coal fired steam power plant; or wherein the flow path has the ability to store the heat of steam, where the steam for storage was withdrawn from the outlet of the high pressure turbine of a steam power plant after a reheater to reduce the pressure.

In a further method for heat storage for providing stored heat using a heat transfer fluid at or about temperature Ta, the method includes the steps of: providing a ceramic heat storage medium having an extended longitudinal section extending along a longitudinal axis, the medium formed with particles, the particles cooperating and defining voids between the particles to facilitate flow of a flow of heat transfer fluid in the longitudinal direction, the voids combining to define a longitudinal flow path along the longitudinal axis through the medium; providing the particles and voids enabling flow of the fluid along a plane perpendicular to the axis laterally across the medium, the particles configured to limit particle-to-particle heat transfer, the particles configured to promote and having an affinity for direct transfer of heat with the fluid in the plane and thus defining a heat front along the plane, wherein the medium and fluid cooperate to transfer heat between the fluid and the medium along the plane to form the heat front perpendicular to the axis and along the plane; providing the particles simultaneously resisting heat transfer by contact with each other and having an affinity for rapidly transferring heat by direct contact with the fluid, and providing the flow path having a port for passing a superheated working fluid, the flow path having a region at the port for storing the heat of the superheated working fluid at temperature Ta after the flow is stopped.

Further embodiments include a flow controller, the controller controlling the flow rate of the fluid, wherein the rate is selected to ensure that the particles and the fluid along the plane arrive at the temperature Ta while in the plane, the flow path having a port for passing the heated fluid at temperature Ta, the vapor phase of the fluid being used as a working fluid in the system and further including a container for containing the medium and having a heat transfer fluid cool port and heat transfer fluid superheat port, the flow path having a superheat region and a boiling region, in the area of the cool port the flow path carrying the fluid as a liquid below the boiling temperature to the boiling region, the flow path storing the heat of the fluid as a superheated vapor at temperature Ta in the area of the superheat port, and the flow path storing the heat of the fluid as a boiling liquid in the boiling region. In various embedment the particles further include heat storage material and heat insulating material, further including periodic insulating porous layers of the insulating material in the flow path to prevent at the front the reduction of the temperature gradient by heat conduction through the particles. In some embodiments, the insulating layer is a plate with passages, the plate made of an insulating heat resistant material or of insulating heat resistant particles similar in size to the heat conducting material.

In a preferred embodiment, there is a heat storage system for providing stored heat of a heat transfer fluid X at or about temperature Ta, the system including: a container having a heat transfer fluid cool input and heat transfer fluid superheat output, the container having a longitudinal section in communication with the input and output; a ceramic heat storage medium in the longitudinal section, the medium having a major longitudinal axis and a minor axis, the medium formed with particles and defining voids between the particles to facilitate fluid flow and heat transfer, the voids cooperating to define a major longitudinal flow path extending along the major axis in the longitudinal section; the flow path supplying a flow of fluid below boiling temperature to the boiling region for boiling, the flow path supplying the boiling flow to the superheat region for heating the flow to superheat; and a flow controller, the controller setting a flow rate of the fluid flow, the rate enabling heating by a sequence of thin slices of the boiling particles in the boiling region and the superheated particles in the superheated region, each the slice of particles being defined by a cross-section of the particles in the minor axis perpendicular to the major axis, the slice being heated and heating a local amount of the flow, a the local amount boiling in the boiling region and being superheated to at or about temperature Ta in the superheated region and then the heat transfer fluid X at or about temperature Ta is outputted at the heat transfer fluid superheat output.

These and other embodiments include various power applications, industrial processes and the like, and may be used in solar power plants, CCPP plants, ICGG plants, coal and gas fired plants, nuclear plants, geothermal plants, and other operations that use superheated fluid to do work, among other applications.

BRIEF DESCRIPTION OF DRAWINGS

The accompanying drawings illustrate embodiments of the invention and serves to explain the principles thereof. It is to be understood, however, that the drawings are designed for purposes of illustration only, and not as a definition of the limits of the invention.

FIGS. 3-5 illustrate comparison of heat propagation during steam regeneration in different embodiments of the present invention, wherein FIG. 3 shows heat front propagation using a $CO_2$ heat transfer fluid system of the invention, compared with FIG. 4 showing heat front propagation in $H_2O$ system of the invention, both at 1500 psi, and compared with FIG. 5 showing heat front propagation in $H_2O$ system of the invention at 600 psi.

Figure 1:
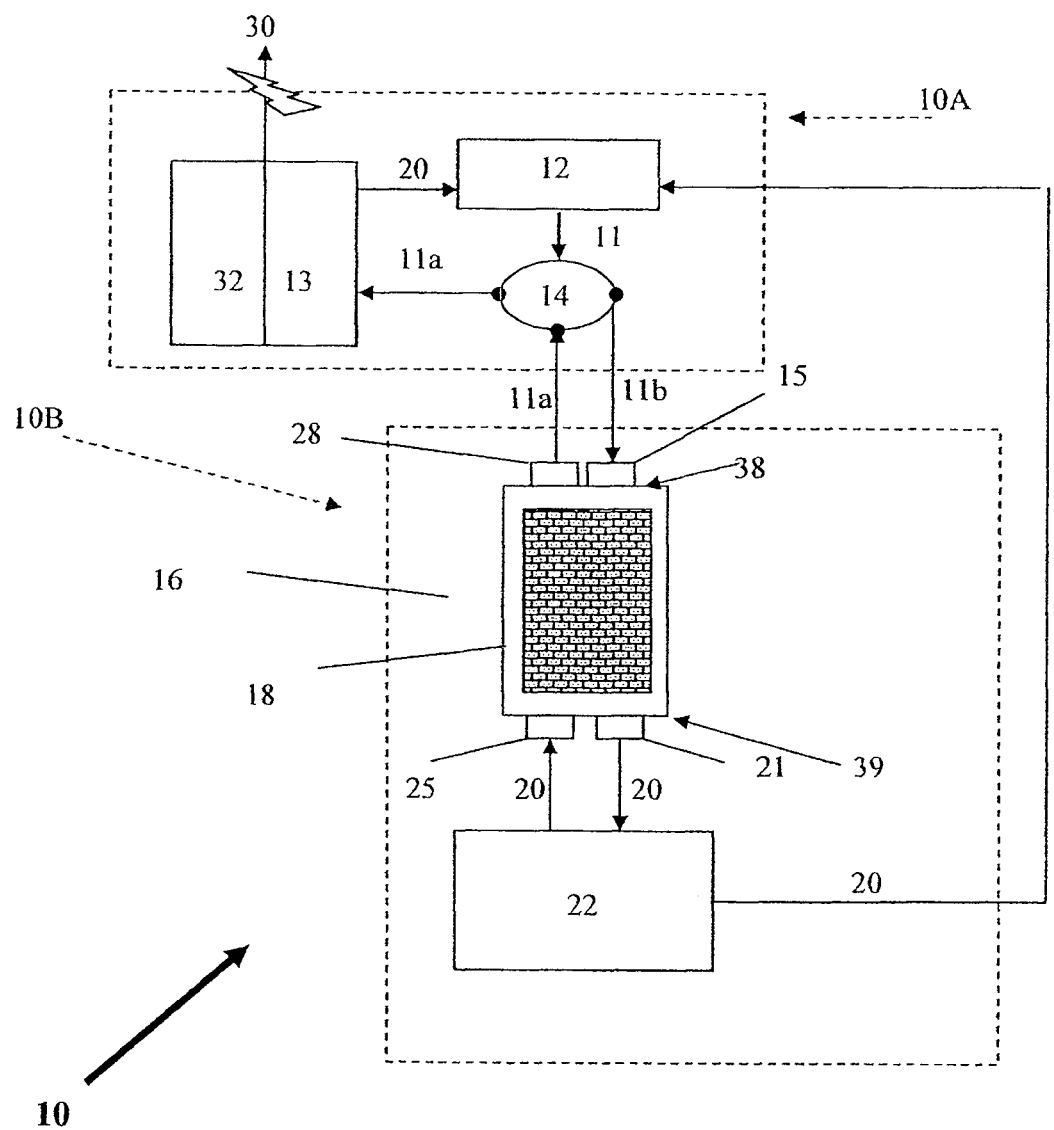
FIG. 1 shows a generic power plant with heat storage system according to the present invention.

Various non-limiting illustrative and preferred embodiments of the present invention are discussed below.

DETAILED DESCRIPTION OF ILLUSTRATIVE AND PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Unless otherwise stated, a reference to a compound or component includes the compound or component by itself, as well as in combination with other compounds or components, such as mixtures of compounds. As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range. However, any ranges not cited in the claims are only intended for illustration and not for limiting the range covered by our invention.

The present invention provides method and apparatus for storing heat in systems, preferably industrial systems, such as in power plants. The present invention overcomes thermal storage limitations and, in fact, enables storage of heat at practically any temperature at which most power plants can operate. The present invention is simple in design, is more robust and is relatively less expensive to implement and operate than other practical methods of heat storage for large applications.

The present invention can be implemented in various systems, and particularly provides storage of heat content of a fluid, and more particularly, a hot working fluid. In one embodiment, the hot working fluid is a fluid which can be heated and in its heated state can be used to perform a work function, such as where water is heated to generate steam and the steam is used to drive a machine to get work done, or serves for other uses of stored heat energy.

The present invention provides for storage of the heat content of a hot working fluid by using the hot working fluid as a heat transfer fluid and depositing the heat content of the vapor phase of that heat transfer fluid onto a heat storage medium in a container and then the cooled vapor changes to a liquid and is removed from the container. When hot working fluid again is needed, a supply of cold working fluid is returned as a heat transfer fluid to the heated storage medium and is reheated to its vapor phase and then taken from the container is used as a hot working fluid. There is no need for a boiler here because the reheating takes the place of a boiler using the stored energy.

In a preferred embodiment, the present invention provides for storage of the heat content of a hot working fluid by using a hot working fluid that can undergo a phase transition as a heat transfer fluid and depositing the heat content of that heat transfer fluid onto a heat storage medium in a container and then the cooled fluid is removed from the container all as the fluid flows in a charging direction through the storage medium. When hot working fluid again is needed, a supply of working fluid is returned as a heat transfer fluid to the heated storage medium, preferably counter-currently to the charging direction, and is reheated and then taken from the container and is returned to the working system to be used as a hot working fluid.

In a preferred practice of the invention, work is performed with and by a working fluid in its heated vapor phase or its heat is stored from that phase and then heat is recovered utilizing the same type fluid first in the liquid phase as a heat transfer fluid and then in the vapor phase and returned as a working fluid. More preferably, the invention uses a steam working fluid and a steam heat transfer fluid, most preferably superheated pressurized steam.

The most important uses of steam in power plants is superheated steam, the free energy of which is strongly dependent upon the temperature of the steam. The present invention can operate with thermal efficiency >90% and perhaps even >95%. The capability to store the heat content of the steam with high efficiency generates many technical opportunities with wide applications in many areas, such as for extending the capacity of power plants, to provide dispatchable energy, to provide a better control function to a power plant for grid regulation, and for other industrial purposes where stored heat or steam is used.

Storing electricity has become a major need in today's environment. As the majority of power plants involve steam, the present invention described herein "stores" the equivalent of electricity for power plants by storing the heat content of the steam. This innovation is cost-effective compared to other approaches for storing electricity in such large-scale, industrial-size volume.

In one embodiment of the present invention, a heat source (e.g., a boiler) generates steam which is used to do work in a working circuit, such as where steam drives a steam turbine to generate electricity. When this working fluid, preferably superheated steam, is available for the storage cycle, i.e., when capacity in excess of demand is available, typically at other than times of peak loading, the superheated working fluid steam is routed from the working circuit to a storage circuit that includes a storage medium, and now this fluid serves as a heat transfer fluid carrying the steam heat to the storage medium where the heat is transferred from the heat transfer fluid steam to the storage medium, wherein the steam condenses and the condensate liquid water is drained from the storage medium. The heat is stored as desired and retrieved when needed. When steam is needed to be retrieved from the storage medium, water is piped to the heated storage medium and steam is regenerated and then returned to the working circuit as a hot working fluid. Preferably the working circuit and the storage circuit are interconnect with appropriate valves to effect a closed circuit, and thus to conserve the fluid (water).

In a preferred embodiment, the invention includes depositing the heat content of the steam on a solid material, preferably with high heat capacity and high conductivity, such as for example alumina pebbles, in a way that we regenerate the steam at or about the original temperature at perhaps slightly lower pressure, preferably by feeding water counter-currently through the storage medium. This is rather equivalent, in terms of efficiency, to storing the steam directly.

Storing the heat content of steam and providing a second turbine to a power plant to utilize the stored heat can be of great help in meeting of national energy needs. Also, storage of steam heat content can help in the combined cycle power plant (CCPP), providing a reasonable turndown ratio and can improve load following capability. In CCPP, the steam power plant in general provides about 40-45% of the total plant electricity output, and the gas turbine can be operated all the time with a boiler at full capacity allowing the second (steam) turbine to load follow while diverting any excess steam to storage. A supplementary turbine is driven with that stored steam in times of need which increase the total capacity of the CCPP for peak loads or otherwise to control grid fluctuations. For regular steam power plants, the question is, in each case, if storing the heat content of steam serves a purpose, such as if it is cheaper versus increasing capacity. in most cases it serves a purpose to provide this extra source of stored energy and it is cheaper.

For concentrating solar power plants steam heat storage is a valuable option, especially as there are already collectors that directly generate steam. Steam is regenerated when needed, e.g., when solar energy is insufficient such as at night. Properly sized, the solar power plant can operate 24/7 and also can be used to control grid fluctuations though use of the present storage system.

As noted above, the embodiments described herein are provided by way of illustration and not limitation and are not intended to limit the scope of the invention or its application to the storage of heat content of a hot vapor. Therefore, as discussed in this disclosure, storage of heat content of steam includes the concept of using any condensable vapor, and includes any two-phase system with one high temperature vapor phase and one cooler liquid phase. That system preferably operates in two phases and instead of water may also use propane, butane, and other condensable gases.

In a preferred embodiment of the invention, a counter-current pebble bed heat exchanger is provided with a storage function, where heat is exchanged non-cyclically, i.e., it is stored and available later on demand. The hot vapor enters the storage vessel in one direction of travel preferably at the top of a vertically oriented vessel, and heats up the storage medium (preferably ceramic particles), and preferably the bottom end is left cool so as not to unnecessarily discharge heat energy as would lower efficiency of storage. The pipes and the medium, as well as the flow, are designed such that the heat progresses through the storage container as a relatively sharp front. Capacity is reached when further loading would discharge steam or boiling water. When heat is to be retrieved, cool water is flowed into the discharge end in the opposite direction of flow for creation and delivery of regenerated vapor, e.g., steam, retrieved from the top of the container and returned to the working system.

In a preferred embodiment, to ensure a sharp front, the fluid that is to be heated (or cooled) flows slow enough such that its temperature completely equilibrates with the storage medium over a very short Distance (compared to the Total Length of the exchanger) most preferably at a factor of more than one in one hundred of (Distance to Total Length), or preferably at least a factor of one in ten, but to get a high efficiency the factor should be much larger than ten.

This requires that the heating up time of a particle, i.e., a pebble or stone, of the heat storage medium is very short compared to the residence time of the vapor. In this case preferably for a given shape of particle, the heat-up time is proportional to $r^2/\alpha$, where '$\alpha$' is the thermal conductivity of the medium and '$r$' a characteristic length of the chosen filler material. Smaller particles with high conductivity are therefore preferable. As will be appreciated by those skilled in the art, this heat-up time controls or limits the ideal maximum velocity permissible for a given storage vessel, both for heat loading and heat recovery.

The present invention provides a heat storage system capable of retrievably storing heat energy in various applications with great efficiency. The heat storage system can be adapted for use with various power sources, such as a steam power source. Embodiments of the invention teach storage of heat in various applications including concentrating solar power plants, steam power plants, coal-fired power plants, combined cycle power plants, small-scale solar power plants, and in other uses.

FIG. 1 shows an illustrative power generating system 10 including a power plant 10A and heat storage system 10B according to the present invention in which power plant 10A generates a hot fluid 11 which can be used for doing work in the plant, or can be used for storing and retrieving heat into and out of heat storage system 10B. From time to time the heat stored in storage system 10B is returned to plant 10A for doing additional work at the plant, also by use of fluid 11.

In practice, the hot fluid (e.g., superheated steam) 11 generated in a boiler 12 is used as working fluid 11a for driving turbine 13 or alternatively this superheated steam is diverted from turbine 13 at valve 14 and is used as a heat transfer fluid 11b in heat storage system 10B.

The hot fluid/superheated steam 11 enters heat storage system 10B as heat transfer fluid 11a via input 15 of storage vessel 16 and flows through and heats heat storage medium 18 within the vessel. This stored heat is later retrieved from the storage medium 18 to regenerate the superheated steam 11 for return to and use at plant 10B as needed.

Figure 2:
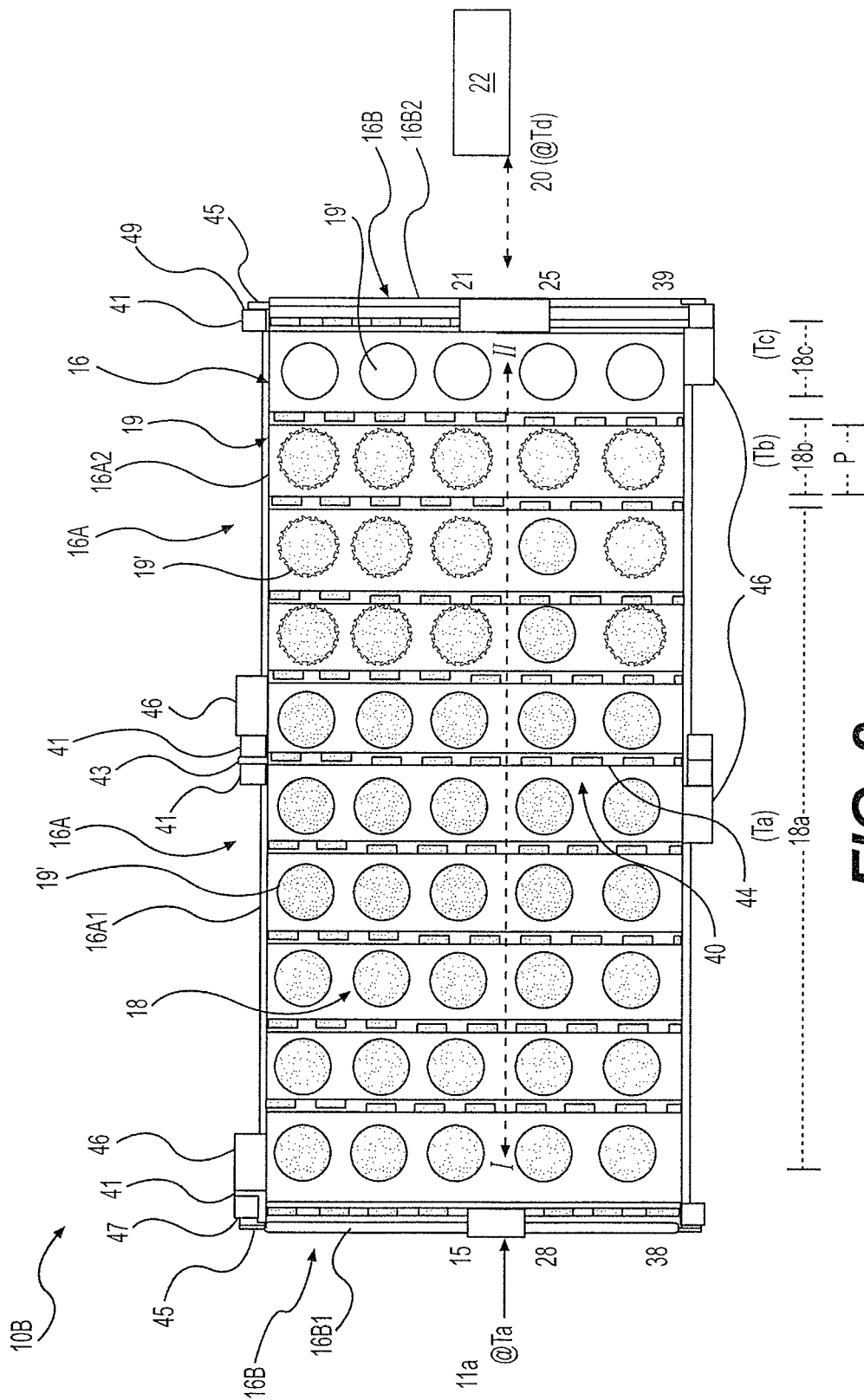
FIG. 2 shows in cross-section an illustrative storage vessel of the invention in one practice of the embodiment of FIG. 1.

Referring to FIG. 2, preferably storage vessel 16 is vertically oriented such that superheated steam 11a is applied to charge heat the storage medium 18 from the top 38 of vessel 16 and flows in the charging direction along longitudinal axis I-II through the storage medium 18 on its journey down to the bottom 39 of vessel 16 where condensate water 20 is removed to holding tank 22. Water 20 is held in this tank and then is returned from holding tank 22 to boiler 12 for reheating or is reintroduced to vessel 16 in a countercurrent flow to regenerate superheated steam 11 as needed.

When superheated steam from storage system 10B is needed, preferably water 20 is pumped from tank 22 to inlet 25 of the vertical vessel 16 upward along axis I-II through the heated storage medium 18 to the top 38 of vessel 16 to regenerate superheated steam 11, with the latter being outputted via outlet 28 at the top 38 of vessel 16 and returned to plant 10A as working fluid 11a to drive turbine 13. In this manner the heat storage state is essentially without a bulk liquid, i.e., the heat from superheated steam is stored, but not the fluid volume, in vessel 16, and then the cooler liquid 20 volume is only reintroduced when regeneration of steam is needed.

In a preferred practice of the invention, vessel 16 is vertical and superheated steam 11 is introduced at the vessel top 38 and travels through the storage medium 18 such that the heat propagates along a relatively sharp front in order to maximize efficiency of heat transfer, at least during retrieval, wherein the vessel top 38 is at maximum heat at the temperature of the inputted steam 11 while the exit end at bottom 39 of the vessel is kept cooler. The relatively colder end is maintained for purposes of efficiency so that boiling water is not flowed out of the storage vessel to tank 22 wherein its heat would be wasted. This is not done where maximizing efficiency of storage is desired.

In preferred practice of the invention, a section of the storage medium is heated to a very high temperature as delivered by the arriving heat transfer fluid. During recovery, the flow rate is controlled so that the heat propagates in a relatively sharp front allowing recovery of the stored heat at the highest temperature at which the heat was stored, preferably from superheated steam. It will be appreciated that if during recovery the front moves too fast, the total storage vessel will be cooled almost uniformly and the temperature of the steam recovered will decline continuously to the average temperature. The total heat recovered will remain constant but only a fraction of the steam will be recovered at the top temperature causing a large loss in free energy. This is avoided in practice of the invention because the highest stored temperature, not the average, is sought to be recovered.

In one illustration, the hot fluid 11 is a superheated gas vapor at an initial temperature and is flowed through vessel 16 until medium 18 is heated to that temperature. As the vapor passes through the medium, it cools and therefore it leaves the vessel at a lower temperature and with the vessel end 24 being at that lower temperature. When the lower temperature starts to rise, the charging process is stopped. However, it is most preferred to keep the temperature at the hot end as close as possible and even constantly at the top temperature to maintain high thermal efficiency. Close control of the temperature at the cold end is not so important but it is at the hot end.

More particularly, superheated steam heat transfer fluid 11a is introduced from the top 38 of vessel 16 and heats region 18a to temperature Ta as it continues its flow until the fluid has released enough energy that it undergoes a phase change and condenses to boiling water and then it heats the storage medium in region 18b to boiling temperature Tb. The condensed heat transfer fluid 11a continues to heat the medium in region 18b to boiling temperature as its flows toward the vessel bottom 39 and thereafter the further cooled heat transfer fluid 11a now at temperature Td reaches region 18c at the end of vessel 16 wherein there is inadequate heat energy remaining to bring the storage medium to boiling temperature for storage, and therefore the heat transfer fluid is discharged to tank 22 as a cooled discharge fluid 20 at temperature Td. Again, for purposes of efficiency it is desired to heat as much of the storage medium 18 as possible during charging of the medium without releasing steam out of the vessel at the outlet 21 and so the discharge fluid 20 would be water at below boiling in this case.

As will now be appreciated by a person skilled in the art, the heat storage system 10B can be controlled during charging by monitoring the temperature of the discharge water 20 and stopping the flow when the temperature either starts to rise or becomes too high, and preferably stops well below boiling (i.e., well below the boiling point of the water at the storage pressure). The flow rate preferably is selected so that as much heat transfer as possible is achieved and with a preference for building a larger superheat region 18a so that upon steam regeneration a greater volume of steam can be regenerated at the superheated temperature Ta, with the rate of flow for regeneration being selected to maximize the delivery of superheated steam as working fluid 11a out of outlet 28 at the top of vessel 16, and the flow of regenerated superheated steam being stopped when the temperature is no longer at the desired temperature to be used as the working fluid 11a, unless an additional reheat is anticipated.

As seen in FIG. 2, in one illustration, the hot heat transfer fluid 11a is a superheated vapor steam at an initial temperature $T_a$ and is flowed through vessel 16 until a first region 18a of medium 18 is heated to that superheated temperature $T_a$. As the fluid passes through the medium, it cools and changes to a boiling water in a second region 18b of the medium at temperature Tb and at the vessel bottom 39 reaches a colder temperature $T_c$ below boiling in a third region 18c and thereafter exits the vessel at outlet 21 at temperature $T_c$. In one embodiment, the flow rate is adequate where a majority of the medium 18 is heated to superheat temperature Ta and only a short region is at boiling and then the end is below boiling.

The level of heating can be detected by monitoring the outlet temperature Td of the fluid flow and as it reaches a designated "stop" temperature then the fluid flow and the charging process is stopped. Preferably, this stop temperature approaches but is below the boiling temperature Tb to minimize heat loss via the hot fluid exiting the vessel, since the heat loss affects overall system efficiency.

In an alternative practice of the invention, the superheated steam 11 at temperature Ta flows through the entire path I-II in the vessel and the flow is stopped only when the outlet temperature Td is at or approaches the initial temperature Ta as the steam flows out of the vessel. This enables maximum storage utilization of the vessel 16 but is at a loss of heat energy carried by the out-flowing steam during the charging process, and therefore it is not done when efficiency matters most.

It will be appreciated that in a solar power embodiment of the invention of FIG. 1, boiler 12 is solar-heated and provides superheated steam 11 to drive turbine 13 or as redirected to storage 10B as described above. In this case, and the regenerated superheated steam 11 from storage 10B drives the existing turbine 13 at night to provide additional electricity output 30. In a conventional fueled power plant embodiment of the invention, turbine 13 is often operated at peak production, and therefore retrieved steam 11 is directed to drive an auxiliary turbine 32 to supply additional electricity output 30 to add to the output of turbine 13, as needed.

In a preferred embodiment, the storage medium 18 has high heat capacity to minimize storage volume, such as by using available, well-known materials, which can be mass produced to keep the cost down. In a preferred embodiment the heat storage medium 18 is formed as a bed 19 of alumina material parts 19', e.g., stones, pebbles or pellets, with the steam 11 traveling along flow path I-II (vertical in FIG. 2) through the medium 18, flowing between the material parts 19'.

It will be appreciated that when storing the heat of the superheated steam, there will be a superheated region 18a and a boiling region 18b and then a short cooler region 18c. In practice, it is desired to maintain a "sharp" front between the heat of the superheated region 18a and the heat of the boiling region 18b. A "sharp" front implies that the superheated region is optimally heated and separated from the boiling region with the boundary moving with the flow accordingly. A sharp front is not necessary in the charging cycle but is high preferred in the regeneration cycle. The fluid flows perpendicular to the cross section through the vessel, with the intent to obtain complete temperature equalization between the steam and storage medium over a short distance, i.e., a few feet along the flow path, which we define as a sharp front as a plane P perpendicular to the longitudinal axis. In one non-limiting illustration, a sharp front relates to as 30' long transition region 18b over a 140' storage path. Plane P is shown in FIG. 2 coincident with boiling region 18b and will be appreciated to move with the fluid flow along the flow axis essentially parallel to the plates 40 in this embodiment.

The preferred storage medium, alumina particles (e.g., stones or pebbles), is selected because the heat transfer resistance in a steam system is low. The latter means that the thermal conductivity of the alumina is high and their size is small so the time needed to reach the temperature of the hot fluid stream is very short compared to the fluid residence time, and the temperature of the alumina thus follows that of the surrounding hot fluid practically instantaneously.

A preferred design allows for charging from the top down and counter-current regenerating from the bottom up, preferably with even and uniform flow distribution laterally across the diameter with complete heat transfer and temperature equalization being reached over a very short distance of fluid flow (e.g., 30' of 140') along the flow axis I-II. The system includes the solid filling, e.g., ceramic particles of high density in a design which enables fluid flow with low pressure drop. The thermal conductivity of the filling should be high and the heating time of the filling should be as short as feasible, but too small particles can cause excessive pressure drops during fluid flow. Even so, as for the latter, low pressure drop in the storage vessels is not critical for steam storage as no recompression is needed. Any design that fulfills the basic design concepts described herein and which allows storage of the heat of a vapor, as from steam, with high thermal efficiency (preferably using counter-current flow) can be used. As will be appreciated by those skilled in the art, the size and structure of the particles will be a compromise between the acceptable heating time and the acceptable pressure drop. Furthermore, as the storage medium, such as ceramic pebbles, is exposed to changing temperatures, pressures and conditions, this material is selected such that it can withstand these conditions, and materials with low porosity (generally <5%) are preferable.

Furthermore, in preferred embodiments, to prevent heat transfer through the particles during storage, especially when there are temperature gradients in the bed, so as to be able to heat slowly to very high temperature in the bed, we preferably place inside the pebble bed, at intervals, insulating porous plates, with holes small enough to retain the filling material. As will be appreciated by those skilled in the art, in a preferred embodiment we specify that heat up time of the solid particles is short.

It will be appreciated, that is preferred and beneficial for highest efficiencies to operate within the window of conditions that allows storage at high efficiency, and therefore, the rate of feeding the superheated steam or the water for regeneration is to be in a manner such that the heat propagates in a sharp front, especially during recovery.

FIG. 2 shows the assembled modules in side cross-section with the peddle bed 19 loaded and filling the vessel interior from the vessel top to the vessel bottom, with flow path I-II extending through the medium 18 between the pebble material 19' of pebble bed 19. In practice of the invention, a single large storage vessel 16 can be used although preferably smaller modules are assembled to form the vessel. A single such module (such as a 20-30 ft long section of pipe) is good for forming a small power plant, while a number of vessels can be assembled for a larger plant. For example seven 20 foot long modules can be stacked to form a 140 foot storage vessel with end caps, i.e., manifolds.

Referring again to FIG. 2, in an illustrative practice of the invention, the storage vessel 16 includes preferably cylindrical modules 16A, with two modules 16A1 and 16A2 being vertically stacked and the closed vessel 16 being formed by addition of manifold plates 16B1 and 16B2 at the top 38 and bottom 39 respectively of vessel 16 on the respect outer ends of modules 16A1 and 16A2. Furthermore, Each module 16A is provided with a flange 41 at its top and bottom such that the mated modules can be and are sealed together at meeting adjacent flanges 41 to form seal 43, as indicated. A manifold plate 16B1 is placed at the top end of module 16A1 such that manifold plate rim 45 cooperates with adjacent flange 41 to form seal 47 thereat and manifold plate 16B2 is placed at the bottom end of module 16A2 such that plate rim 45 cooperates with adjacent flange 41 to form seal 49, thus to provide a sealed storage container 16, as shown in FIG. 2. The cylindrical modules 16A, 16B of FIG. 2 preferably use sections of ready-made large diameter steel pipes such as those used for natural gas pipelines, each cut into a length that is easy to transport and to assemble (such as 20-30 ft long sections), and equipped with the flanges to assist assembly of the vessel on location. These modules 16A, 16B, etc., are preferably fitted with perforated plates 40 (FIG. 2), the holes 44 of which are smaller than the diameter of the storage material 19', to retain it in place. As will be understood by a person skilled in the art, these plates 40 also serve as conventional flow distributors with a desired pressure drop. It will be further appreciated that preferably these plates are made of non-conducting ceramic to minimize heat conduction through the storage material, since heat transfer is ideally restricted to direct contact between fluid 11a and pebble material 19' and because equilibration between hotter and colder sections of storage could reduce the volume of highest temperature superheated steam that could be regenerated and delivered from the storage. It is desirable to limit conduction of heat particle to particle, and therefore in one practice of the invention we place an insulating step such as plates 40 at intervals, the plates having enough porosity to permit fluid flow and small enough to hold the particles in place.

In this manner, heat may be retained for a long time in each charged section. This arrangement also facilitates partial recovery section by section where there can be separation between hot and cold sections of the storage unit, such as when partially recovery of some of the stored heat is made. In one embodiment, additional ports 46 are also provided to facilitate partial recovery or other alternative fluid flows such as for adding fluid input for storage or recovery or to draw off fluid for temperature monitoring or the like.

One example of a recommended ceramic filling material 19' is using small balls of non-porous alumina 1-10 mm in diameter (preferably 2-3 mm), with the desired outcome being a fast heating medium.

The configuration of the modular vessel and associated feed pipes forms a strong structure wherein the flanged pipe sections reinforce strength of the individual pipes to form a strong high structure that can be anchored to the ground. Commonly, pipe sections are available for pipelines in sizes up to about 5 ft diameter. This design avoids field construction and can be transported in trucks. These sections should be designed for easy assembly on location. For this purpose, the sections should be short enough, such that they can be made and filled with the ceramic in a shop, and transported completely ready for final assembly. This is less expensive than building large storage vessels on location.

In one embodiment, the storage medium is suitable over a wide temperature range, preferably from ambient temperature to above the maximum temperature required for a given power technology. This temperature is about 1350° F. for high efficiency steam power plants and between 2200-2500° F. for gas turbines. The maximum temperature achievable also determines the cost of the storage. In fact, while high temperatures may require more expensive materials, the storage volume needed, and therefore the cost of the system, is inversely proportional to the difference between the top and bottom temperatures of the power cycle, just as in a power plant.

It will now be appreciated that in the steam embodiment of the present storage invention, vapor and liquid phases of the same constituent fluid, i.e., water, are used. This advantageously enables the same fluid to interchangeably be both a working fluid and a heat transfer fluid, which allows for great economy in a working system. Thus in practice of the invention, the storage medium 18 is charged with heat preferably from superheated pressurized steam 11, and then the heat in the storage medium 18 remains stored until later demand-driven retrieval using cooler water 20. Hence the working fluid of the system (e.g., steam) is also the heat transfer fluid (e.g., steam) for use downstream, such as for driving the steam turbine 13 for power generation.

Using water/steam as the heat transfer fluid has the advantage of a high heat transfer coefficient. In the past there has been no practical storage for superheated steam. But in the present invention, in a preferred embodiment, superheated steam is used, preferably filling the storage vessel from the top down as described. Later, the heat can be recovered by feeding cold water at the bottom, regenerating in a counter-current way, and leaving from the top as superheated steam, practically at the same temperature and pressure as the originating storage. A preferred process of the invention is: supply superheated gas vapor (e.g., steam) 11, store the heat in medium 18 which condenses the vapor (e.g., steam) and then discharge the condensate liquid 20 (e.g., water) to tank 22, wait for demand, and regenerate heated gas vapor (e.g., steam) 11 after reintroducing the cool liquid 20 into the vessel.

Preferably the superheated steam input 15 and the regenerated steam output 28 are located above the storage medium 18 at the top 38 of vessel 16 and the liquid output 21 and input 25 are located below the storage medium at the bottom 39 of vessel 16. In this manner, the storage medium 18 and fluid flow are vertically oriented within vessel 16, such as would accommodate introduction of steam 11 at the top and allowing condensed liquid falling toward the outlet after heat transfer and phase change and would also accommodate steam rising after introduction of the cooler liquid 20 during steam regeneration. This arrangement assists in regeneration of superheated steam 11.

It will be further appreciated that input/output 15 and 28 on the vessel top may actually be a single bi-directional port that from time to time serves the respective described inlet and outlet functions and likewise for inlet/outlet 21 and 25 at the vessel bottom may be another single bi-directional valve serving the respective described functions. In any event, preferably these port are open during charging of the storage medium and for regeneration and closed during storage.

Furthermore, in preferred embodiments, to prevent heat transfer through the particles during long periods of storage, especially when there are temperature gradients in the bed, so as to be able to heat slowly to very high temperature in the bed, we preferably place inside the pebble bed, at intervals, insulating porous plates or matter, with holes small enough to permit fluid flow while retaining ceramic material 19'.

Steam is an advantageous heat transfer fluid choice for many applications, especially in small-scale plants for distributed energy, for which turbines with reheat may not be available. For power plants that use a gas as the driving fluid (e.g., gas turbines, Stirling engines or similar devices), the present invention enables use as heat transfer fluid the same gas used as working fluid.

It will be further appreciated that there is no need for a boiler for reheating of working fluid in an H2O system; the charged storage vessel 16 is the boiler. In a preferred C02 embodiment of the invention, regenerated superheated C02 would be taken to a boiler for generation of steam which in turn would drive a steam turbine.

Figure 3:
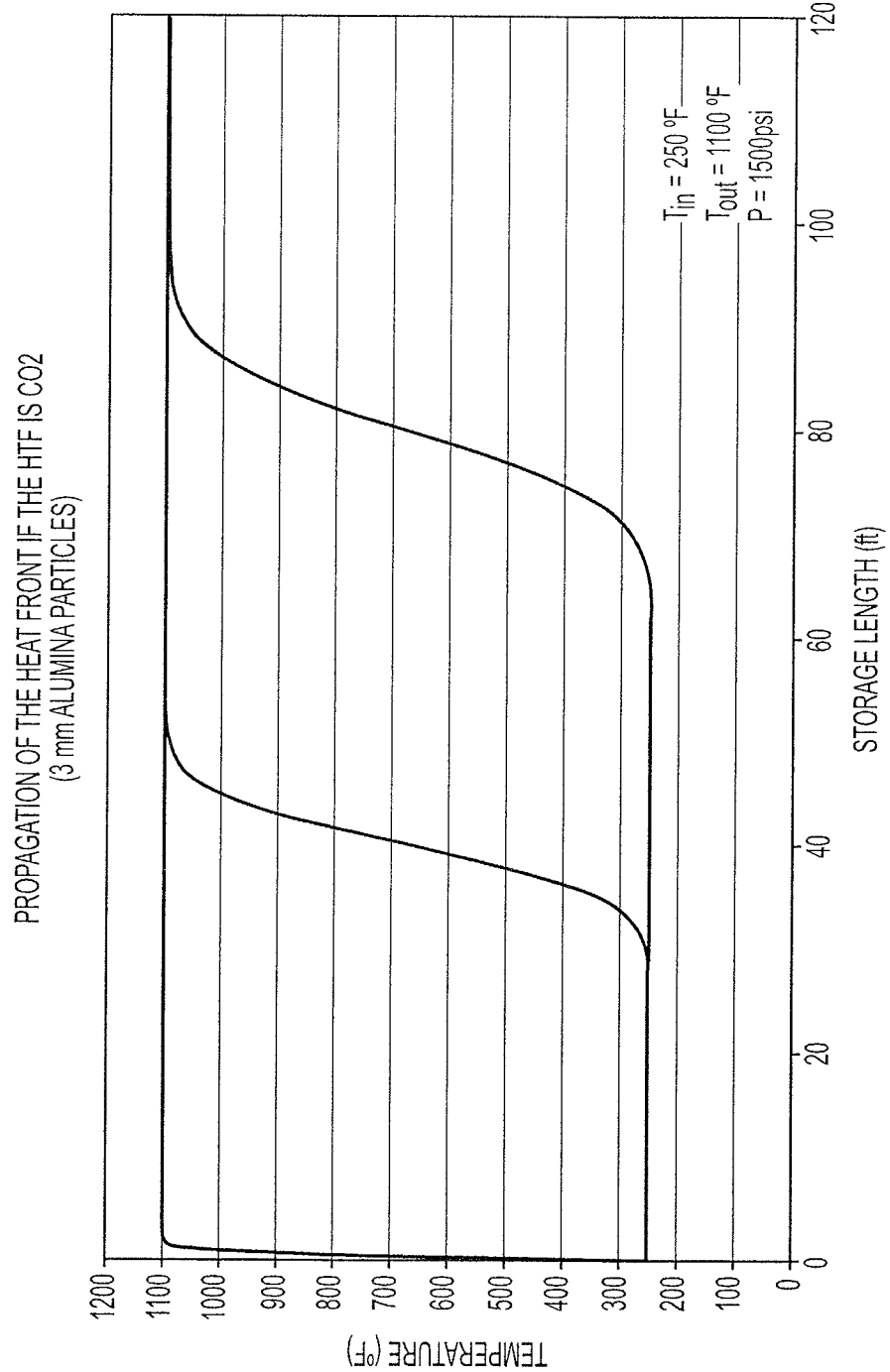
Figure 4:
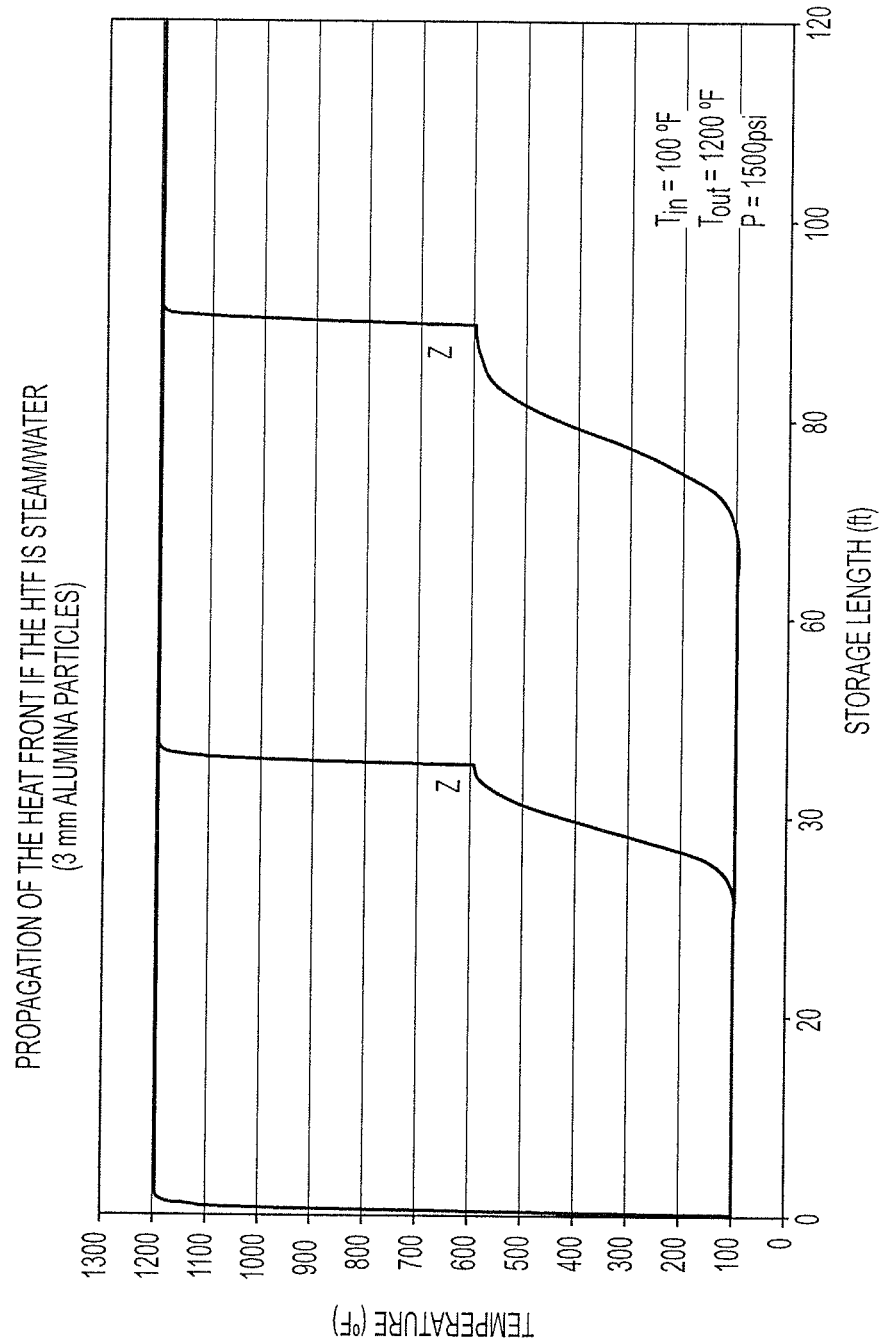
Figure 5:
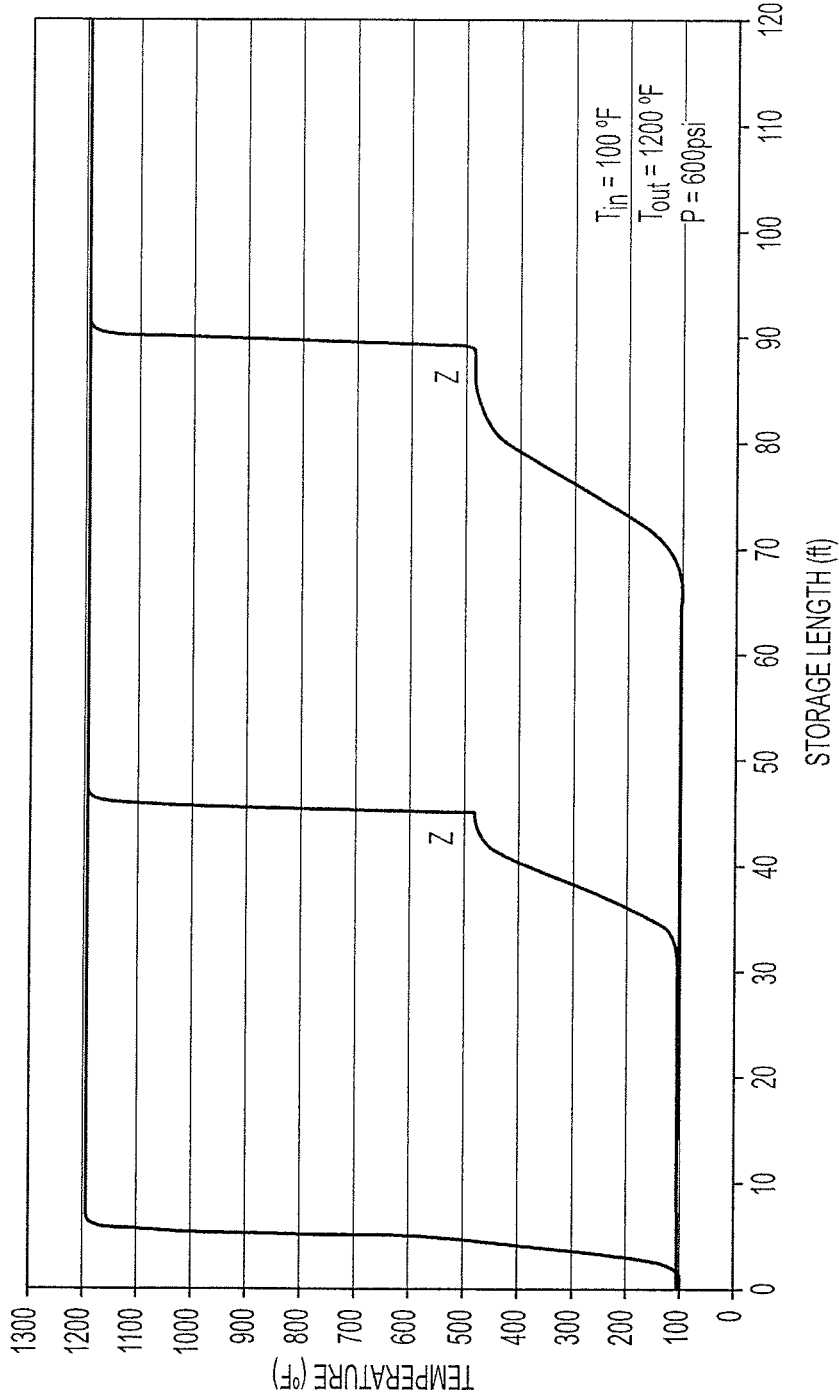

FIGS. 3-5 provide a comparison of heat propagation in different embodiments of the invention. FIG. 3 shows heat front propagation using a CO2 heat transfer fluid system, showing a plot of the progress of the heat front in the vessel at 1500 psi during heat recovery.

FIG. 4 shows heat front propagation of superheated steam in a H2O system of the invention at 1500 psi and 1200 F during heat recovery. As will be appreciated by a person skilled in the art, at constant pressure, the larger the super heat the steeper is the front and the steeper the front the more efficient the heat transfer. In storing the heat of steam, recovering steam with the same superheat is done in one embodiment with a lower pressure to avoid a "pinch" caused by the phase change (at "Z"). As long as the final steam temperature remains constant, the effect of reducing pressure on efficiency is small. Looking at FIG. 4 it is seen that there is a growing but short flat section of the temperature front as it progresses. As long this stays inside the completely heated section, the steam is superheated. The plots in FIGS. 4 and 5 are schematic only and are based on the assumption that the temperature in the entire bed is constant. As will be appreciated by a person skilled in the art, in an actual cycle the temperature profile is much more complex but the character of the temperature front is similar to those illustrated in FIGS. 4 and 5.

As will be further understood by a person skilled in the art, this short section at constant temperature can cause a "pinch" in the storage cycle. One way to overcome the effect of this pinch is to carry out the recovery cycle at a lower pressure such that the flat section is below the boiling point of the steam used for the storage. This is demonstrated in FIG. 5, by reducing the pressure to 600 psi (or even 400 psi) the temperature of this flat region Z is significantly reduced below the boiling point of the fresh steam that enters the storage. Since storage is not done below the boiling point, the pinch then does not matter.

If the flat region at the end of the storage cycle is short, there is an alternative way to overcome the pinch, i.e., by supplying heat to overcome the pinch in this flat region using only the superheat of extra steam. The extra heat of condensation and cooling the condensed water will result in a higher temperature in the cold section. This is useful when the flat section is short. These two approaches can be combined and optimized as desired. In most cases the first method is preferred. What allows us to do the reducing of pressure is that at constant superheat the pressure has only a small impact on free energy.

The formation of the heat front during recovery occurs in view of the fact that there is a leveling or break in the slope of the heating rate due to the fact that the evaporation occurs at constant temperature. In one embodiment we reduce pressure to accommodate this. As shown in FIG. 5, by reducing the pressure to 600 psi (or even 400 psi) the temperature of this flat region Z is significantly reduced below the boiling point of the fresh steam that enters the storage. Alternatively, more steam is fed to the storage, the heat of which will be recovered as hot water close to the boiling point. For more efficiency, the hot water can be fed to the collectors or boilers to add heat and to maintain system efficiency. These two approaches can be combined and optimized as desired. In most cases the first method is preferred. What allows us to do the reducing of pressure is that at constant superheat the pressure has only a small impact on free energy.

Furthermore, in preferred embodiments, to prevent heat transfer through the particles so as to be able to heat slowly to very high temperature in the bed, we preferably place inside the pebble bed, periodically, insulating porous plates, with holes small enough to retain the filling material, or alternatively we can use thin layers of insulating particles the same size as the storage particles.

There are no physical constraints on the temperatures and pressures at which steam can be stored. The question is cost. The cost of the vessel starts to rise sharply as pressure goes up above 1800 psi. In our preferred design, the pressure has very little impact on cost as long as the pressure is below say 1200 psi, or even 1500 psi where the effect is still small. If needed, and the higher cost is justified, storage vessels can be designed for higher pressures.

The same applies to temperature. The storage method itself has no temperature limitations, but above 1100 or 1150° F., the vessels and pipes should be made of stainless steel, which can be used up to 1500° F., though as a practical matter few applications of steam require storing at temperature higher than 1400° F. However, standard steel vessels can be used at higher temperatures by insulating them from the inside with ceramic coating, and then insulating the outside is not done.

In a preferred practice of the invention, the heat propagates along a relatively sharp front in order to maximize heat transfer, wherein the hot exit always stays hot and the cold exit cold, by stopping or reversing the cycle before the thermal front reaches the exit. It is highly preferred that the hot end of the storage vessel always stays at the maximum temperature of the steam or vapor to be stored. Thus, while the temperature of the hot end can vary, it is preferred that the hot end of the storage vessel stays at a substantially constant temperature. The cool end need only be at a temperature below the boiling point of the steam or vapor used for the charge. Thus, the temperature of the cool end can vary without preference for remaining at a substantially constant temperature.

It will be appreciated that the present invention takes advantage of the principle of a recuperative heat exchanger, which in the past has been used to improve the thermal efficiency of power plants by heat exchanging hot flue gas with fresh air fed to a combustor, in a cyclic process of heat and exchange. The same principle has been used more recently in the development of cyclic catalytic reactors. Typically, for the recuperative heat exchanger and the cyclic catalytic reactor, the cycles alternate and are of equal duration, while gas velocities are also equal in both directions.

The present invention includes recognition that these cyclic heat exchangers can be modified to provide added value to power generation, wherein charging of the storage medium is interrupted after heat storage, with the storage medium storing the heat until it is needed. This can be for any realistic period of time according to the capacity of the storage system.

As will be appreciated by a person skilled in the art, to derive a sharp front, the feed is made uniform across the cross-section, perpendicular to the direction of flow through the medium. In a preferred embodiment, we use a flow distributor with a pressure drop and we require that the heat transfer resistance of the storage is low enough and the thermal conductivity of the pebbles is high enough and their size small enough so the time needed to reach the temperature of the gas stream is acceptably short or even very short compared to the gas residence time, and the temperature of the particles thus follows that of the surrounding fluid practically even instantaneously.

In an preferred embodiment, the storage medium is suitable over a wide temperature range, preferably from ambient temperature to above the maximum temperature required for a given power technology. This temperature is about 1350° F. for high efficiency steam power plants and between 2200-2500° F. for gas turbines. The maximum temperature achievable also determines the cost of the storage. In fact, while high temperatures may require more expensive materials, the storage volume needed, and therefore the cost of the system, is inversely proportional to the difference between the top and bottom temperatures of the power cycle, just as in a power plant.

In a preferred embodiment, the storage medium has high heat capacity to minimize storage volume, and preferably uses available, well-known materials, which can be mass produced to keep the cost down. In a preferred embodiment the heat storage medium uses small alumina pellets.

Using water/steam as heat transfer fluid has the advantage of a high heat transfer coefficient. In the past there has been no practical storage for superheated steam. But in the present invention, even superheated steam can be used, preferably filling the storage vessel from the top down as described. Later, the heat can be recovered by feeding cold water at the bottom, regenerating in a counter-current way, and leaving from the top as superheated steam, practically at the same temperature and pressure as the originating storage.

FIG. 5 illustrates this, showing heat front propagation in H2O system at 600 psi. By reducing the pressure to 600 psi (or even 400 psi) the temperature of this flat region Z significantly reduces below the boiling point of the fresh steam that enters the storage. Alternatively, when the region of the pinch is small, we can simply feed to the storage more steam, the heat of which will be recovered as hot water close to the boiling point. The hot water can be fed to the collectors or boilers increasing their flow such that no heat is lost as more steam is generated with the same heat input. These two approaches can be combined and optimized as desired. In most cases the first method is preferred. What allows us to do the reducing of pressure is that at constant superheat the pressure has only a small impact on free energy.

There are no physical constraints on the temperatures and pressures at which steam can be stored. The question is cost. The cost of the vessel starts to rise sharply as pressure goes up above 1800 psi. In our preferred design, the pressure has very little impact on cost as long as the pressure is below say 1200 psi, or even 1500 psi where the effect is still small. If needed, and the higher cost is justified, storage vessels can be designed for higher pressures.

The same applies to temperature. The storage method itself has no temperature limitations, but above 1100 or 1150° F., the vessels and pipes should be made of stainless steel, which can be used up to 1500° F., though as a practical matter few applications of steam require storing at temperature higher than 1400° F. However, standard steel vessels can be used at higher temperatures by insulating them from the inside with ceramic coating, and then insulating the outside is not wanted.

The length of each vessel and the number of vessels required depends on the specific design. The actual design depends on the load pattern and the physical constraints and it is preferred that the design be guided by assuring that under all conditions the heat front remains sharp enough to guarantee that the top temperature, at which the heated steam leaves the storage vessel, remains at all the time at the desired value. Some Illustrative Applications of the Steam Storage Invention:

Concentrating Solar Power Plants (CSP):

Most presently operating CSP plants, and those in development, use steam as a working fluid, which is generated in a boiler, while they use another heat transfer fluid in the collectors and in the storage if any. There are, however, operating CSP plants using steam as a heat transfer fluid. We believe that boiling water/steam systems can provide the best heat transfer function.

One known example is a solar tower operating at 600° F. using a short-term storage method of storing pressurized boiling water in a vessel and generating steam by reducing the pressure. This is not efficient. But such a tower could be easily modified in practice of the invention to generate steam with a temperature of say 1200° F., and superheated steam has a large advantage in thermal efficiency over saturate steam.

There are available trough collectors with direct steam generation generating superheated steam at 1050° F. or higher. But these collectors presently lack storage. In practice of the invention, we provide the storage at very high efficiency, to recover back exactly the same steam at the same pressure and super heat or, in some cases, the same super heat but at lower pressure. This increases the $\Delta T$ for the storage and therefore reduces the size of the storage vessels and their cost.

Steam has a large advantage over Dowtherm and molten salt, which are presently used respectively as heat transfer fluid and storage medium, as it has no temperature limitations. It also requires no heat exchangers or boilers. As well, the $H_2O$ system can be used most economically as both a working fluid and as a heat transfer fluid.

The present steam system of the invention requires no boiler and therefore there is no temperature loss due to heat exchangers. The design is simple and no compressors are needed; pressure drops in pipelines or collectors have very little impact, as at constant super heat, and no reheat, the efficiency is only a weak function of pressure.

Solar power plants with direct steam are advantageous for a number of uses. With direct steam there is no need to recompress any gas or pump a hot transfer fluid over large distances, both of which require parasitic power consumption. In a direct steam use without reheat there is still a higher temperature achieved without heat transfer being required. Higher temperature plus the lack of parasitic losses compensate for a significant part of the difference in efficiency versus added reheat.

One preferred application of direct steam is for small CSP plants, say below 100 MW and especially for smaller distributed CSP plants down to sizes of perhaps 50 kW. These are useful for remote locations.

Power plants have a significant size factor. A 10 MW conventional coal power plant built with a given efficiency and pollution control is approximately three times more expensive per kWh than a 200 MW plant for the same conditions.

The effect of size on cost is much smaller for CSP plants with direct steam storage. CSP collectors and the storage vessels for our method are an assembly of modules preferably mass produced and sized for easy shipping. In an illustrative system, all we need are enough collectors, storage vessels, pumps, and a turbine, tied together, and the size effect is relevant only for the turbine and the pumps which are a small fraction of the total cost of a CSP. In this case the simplicity of a CSP with direct steam storage gives it a large advantage for small plants versus coal or for other types of CSP or solar energy.

The second application where solar direct steam storage has a decisive advantage is for CSP plants designed for either cogeneration of steam and electricity for large chemical plants and refineries, or for large-scale steam generation for heavy oil recovery or similar uses, in areas that have sufficient sun. In all these applications, 24-hour operation is essential and the storage method of the present invention can supply this cheaper than any other CSP design.

For all these applications, superheated steam is preferable, which is important as storage of low temperature saturated steam is feasible according to the present invention, but would be more expensive. The pressure of the steam should be chosen for the application, but for storage it is advisable to keep the pressure below 1500 psi, as high pressures give too high a storage cost. For small CSP plants with direct steam generation such high pressures are not suitable anyway: 1000 psi is plenty in such case. On the other hand, super heat at least above 1000° F. provides for both efficiency and low storage cost.

Figure 6:
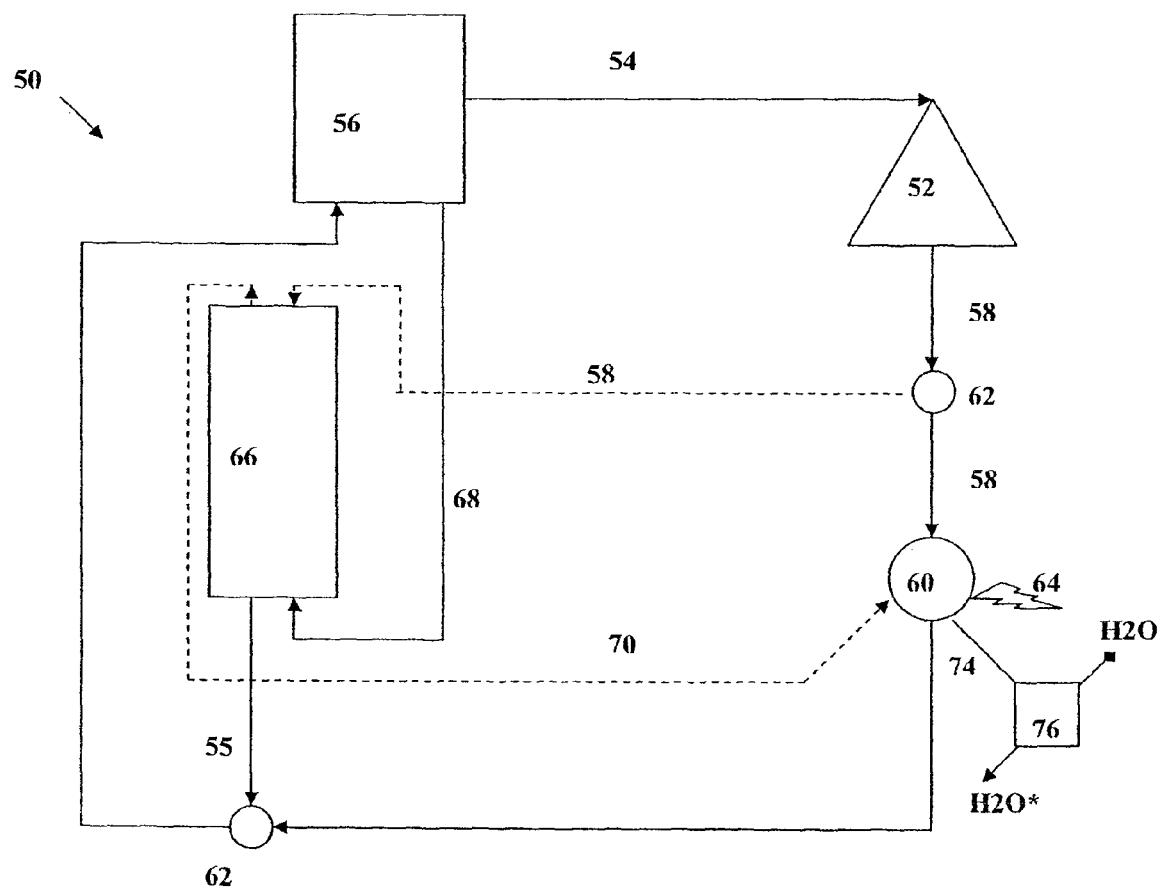
FIG. 6 illustrates application of a heat storage system according to the present invention to a small-scale solar steam power plant as one of many applications of the invention.

FIG. 6 illustrates a further embodiment for a small-scale concentrating solar power plant 50. Solar collectors 52 are provided with water 54 from a water tank 56 and generate superheated steam 58 in the collectors which is fed to steam turbine 60 via control 62 to generate electricity at output 64. When operating at less than peak power, additional or spare superheated steam 58 is diverted at control 62 into heat storage 66, which stores heat from the diverted steam as earlier described. The condensate water 55 is returned via control 62 to tank 56. When heat is required to be retrieved, cold water 68 from tank 56 is introduced into the heat storage tank 66 preferably counter-currently from below. Water is converted to superheated steam 70 and taken from the top of the storage 66 and is applied to drive turbine 60 to produce electricity at output 64.

The embodiment of FIG. 6 deals with a special need: supplying electricity to remote areas with abundant sunshine but no connection to the grid and possibly with fuel and water in short supply. This situation exists in many underdeveloped countries and in places where it is too expensive to build a connection to the grid. To supply small villages or cities, the size of such plant should be between perhaps 50 KW to 20 MW. These small plants are inherently more expensive on a kilowatt basis than large plants but they are certainly competitive in absence of a grid or fossil fuels, and are much cheaper than PV with storage batteries, and certainly are needed where the resources to build a larger plant are not available.

Preferably, such small CSP plants should have low maintenance requirements and operate without needing a dedicated full time operator or many skilled personnel. Additionally, a relatively large store capacity is desired, preferably for more than one day. Water cooling should not be required. The design according to the present invention fulfills all these requirements.

A preferred embodiment features parabolic trough collectors or other sets of collectors in which the heat exchange fluid is $H_2O$ based, e.g., water is fed to the collectors and heated to superheated steam). These collectors are available from several companies (e.g., Schott) in a design that can be mass-produced. The superheated steam can be fed directly into a steam turbine designed as a backpressure turbine with air cooling; the condensed water is recycled to a storage tank and then to the collector.

If local conditions permit, the CSP plant can serve a second function if turbine 60 is a back pressure turbine. The steam 74 exiting backpressure turbine 60 can be used for purifying or desalinating a local water source. As shown in FIG. 6, steam 124 is applied to desalinization boiler 126, wherein inputted $H_2O$ is processed and outputted as potable water $H_2O^*$.

It should be appreciated that according to the present invention a storage system is provided which can store the heat of superheated steam and when required can generate steam with the same superheat. The system is simple. There are no compressors or boilers and only a few pumps. The entire system can be designed and manufactured for shipping by truck for easy assembly on location. Also, it can be designed for totally automatic control. It is also relatively low cost.

In this embodiment, underdeveloped countries with small local settlements that are located far from the grid could gain a reliable source of energy as this system should be much cheaper than systems based on solar cells combined with batteries. Small CSP plants could be used to produce electricity for communication, refrigeration and lighting and also, for purifying local water sources, irrigation and agriculture and, for providing power for small industry. In developing countries, small plants could be used for distributed energy. Although they are less efficient and more costly than large power plants, they are still much cheaper for remote locations than any other form of alternative energy. Furthermore, it will be appreciated that while certain embodiments are discussed herein, direct use of steam is not limited to small plants and can be used in various applications for the benefits that are gained.

Combined Cycle Power Plant:

The present invention covers not only the unique storage method, but also its applications. One application that has a large number of implementations is storage of steam in combined cycle power plants (CCPP).

Combined cycle power plants, which have a high temperature gas turbine, the hot exhaust of which is used to provide the heat for a companion steam power plant, are for gaseous fuel the most efficient power plants (up to 60% efficiency) a higher than any power plant based on fossil fuels. They can be fueled by natural gas, diesel oil, methanol and other lighter clean fuels, and are also used in IGCC power plants, which provides clean power from coal. Gas-fired CCPPs supply 20% of the electric power used in the US today.

All CCPPs have, however, one disadvantage: they cannot rapidly load follow. For high efficiency the gas turbine has to operate at maximum load, and when the load goes below 80% they become very inefficient. They can however be shut down and started up again in much shorter time than a coal power plant, the latter of which has a very high turndown ratio (8:1) but takes at least half a day to start up.

CCPPs are in wide use today. The steam power plant part of the CCPP supplies between 36-45% of the total electricity of the CCPP plant and has, by itself, a high turndown ratio. However, as the steam plant has to accept all the hot gas from the gas turbine, this control capability cannot be utilized. But the present innovation for storing steam totally changes this.

The steam plant can be controlled separately by diverting any unneeded steam to a heat storage unit according to the present invention. The gas turbine always operates at optimal capacity and all control of the output is done by controlling the amount of steam fed to the steam turbine, diverting the rest to storage. To utilize the stored steam, in addition to the storage, there is provided an additional steam turbine, the size of which can be chosen based on the load following capability designed. Thus, it could be bigger than the steam turbine in the original plant to provide larger peak power or load following capability for a designed time period. Thus, there is provided fast load following capability with a 40% turndown capability, and the capability to increase the power for short times by even a large ratio. This totally changes the capability of combined cycle plants to load follow.

Conventional Steam Power Plants:

50% of U.S. electricity, and a large fraction world wide, is still supplied by conventional steam power plants, the major fraction fed by coal, but some fired by heavy oil, petroleum, coke and natural gas. Pollution control has increased their cost. Addition of green energy sources to the grid increases the need for more capable control functions in our power plants and the present invention can provide this.

Due to their fast response and high turndown ratio, standard steam power plants can handle any load problems and high load variability simply by having a sufficient over-capacity, which is what utilities did in the past. However, large overcapacity is expensive and is a rarity today. Today, overcapacity is limited to periods of low electricity demand such as at night and over weekends. Control is needed, however, mostly during periods of high demand. Meanwhile, storage of steam can reduce the overcapacity needed for control of the grid and provides a significantly cheaper alternative.

In this case, the boilers run at full capacity all the time and excess steam is shifted from the turbine feed to the storage vessel. However, in most large conventional power plants the superheated steam is generated at high-pressure, either 2500 psi or even over 3200 psi (supercritical conditions) and storage vessels for pressures above 1500 psi are expensive.

There are several solutions to this. In one embodiment, all of the steam can be withdrawn for storage after the reheater, where it has a suitable lower pressure. The high-pressure turbine will still generate electricity as electricity is needed even in periods of low demand. In a second embodiment, the steam can be expanded adiabatically. Using a reheat turbine for the stored steam is not practical as the steam is only needed when the load exceeds the maximum capacity, a point where the boiler is fully utilized; instead the storage unit acts as a "boiler" making steam available as needed. The special turbine for the stored steam can be sized according to system needs and if the extra load is only used for short times, results in total output being temporarily much greater than the design capacity of the power plant. This method is a very cost effective tool to deal with peak loads and load fluctuations, allowing to add short-time extra capacity much cheaper than building new coal power plants, and cheaper that just increasing the bulk capacity of new power plants to greater than needed on a steady basis.

Geothermal Plants:

Geothermal plants can easily load-follow, but, as the main cost of geothermal electricity is the investment cost for a specific capacity, then it follows that redirecting (i.e., reducing) capacity to control load following results in a large economic loss. The present storage invention overcomes this problem for Geothermal as for other power plants. The present system for storing the heat of steam allows the steam to be stored at times of low electricity demand and therefore, at low electricity prices. When electricity is recovered from storage when electricity is at a higher cost, i.e., when there is a strong demand, there is a large savings. This is so because the present storage invention cost per Kwh stored is much lower than the price differential between high and low demand.

It will now be appreciated that according to the invention, steam heat energy can be stored at very high efficiency and retrieved and used a cost savings. Superheated steam by itself cannot be stored efficiently at reasonable cost, but this invention provides a solution that is as good as storing the steam by storing the superheat at high temperature and retrieving same.

The present invention solves a number of problems faced by prior art power plants and the power industry. The invention enables storage of solar energy and enables power generation at times when solar energy is not available. Conventional power plants can be equipped with heat storage capacity to store heat during off-peak time and use it for extra capacity during peak time or anytime when load following and control of grid fluctuations is needed. With this storage capability, these power plants provide an improved control function for the grid. As well, by adding an auxiliary turbine, the peak load capacity of a power plant can be extended beyond its normal capacity and reducing the need for additional power plants for peak demands.

It will be appreciated that certain changes and modifications may be practiced within the scope of the appended claims. Accordingly, it should be recognized that other systems, functions, methods, and combinations thereof are possible in accordance with the present invention. Furthermore, although the invention is described with reference to specific embodiments and figures thereof, the embodiments and figures are merely illustrative, and not limiting of the scope of the invention.

What is claimed is:

1. A heat storage system for providing/storing heat, heat being stored using a heat transfer fluid at or about a predetermined temperature, the system comprising:

a storage container; and a ceramic heat storage medium, said medium having an extended longitudinal section extending along a longitudinal axis of said container, said medium formed with particles, said particles cooperating and defining voids between said particles to facilitate flow of heat transfer fluid in said longitudinal direction, said voids combining to define a longitudinal flow path along said longitudinal axis through said medium;

said particles and voids enabling flow of said fluid along a plane perpendicular to said axis laterally across said medium, said particles configured to limit particle-to-particle heat transfer, said particles configured to promote and having an affinity for direct transfer of heat with said fluid in said plane and thus defining a heat front along said plane, wherein said medium and fluid cooperate to transfer heat between said fluid and said medium along said plane to form said heat front tending perpendicular to said axis and along said plane; said heat front propagating along said axis;

said particles simultaneously resisting heat transfer by contact with each other and having an affinity for rapidly transferring heat by direct contact with said fluid; and said container having a heat transfer fluid inlet, at least one insulating layer placed in said longitudinal flow path separated from said inlet to define a compartment, said at least one insulating layer adapted to substantially prevent reduction of temperature gradient within said compartment; said at least one insulating layer having a porosity sufficient to allow the flow of heat transfer fluid along said flow path and out of said compartment.

2. The system of claim 1 wherein said insulating layer defines at least two container modules;

each one container module comprising an interconnection component at each end of said each one container module; said interconnection component enabling connecting one container module to another container module and forming a seal therebetween;

a first manifold plate located at one end of said container; and a second manifold plate located at another end of said container;

each one of said first and second manifold plates forming a seal at a corresponding interconnection component;

one manifold plate having a heat transfer fluid cool port and another manifold plate having a heat transfer fluid superheat port.

3. The system of claim 1 wherein the insulating layer is a plate with passages, said plate made of an insulating heat resistant material.

4. The system of claim 1 wherein said insulating layer is a layer of insulating heat resistant particles similar in size to the heat conducting material.

5. The system of claim 1 wherein said flow path enables storing the heat of steam generated in a concentrating solar power plant, regenerating this steam by feeding water to the storage vessel, for delivery of said regenerated steam on demand; the transfer of heat from said fluid to said medium resulting in heat storage.

6. The system of claim 1 wherein said flow path, for steam generated in the steam boiler of a combined cycle power plant, enables storing heat of steam whenever the steam is not needed to generate electricity, thereafter using the steam stored whenever needed in a separate turbine providing thereby load following capability and storage to a combined cycle plant; the transfer of heat from said fluid to said medium resulting in heat storage.

7. The system of claim 6 wherein said extra steam turbine is larger than the steam turbine of the plant itself and providing larger short term load following capability to use to stabilize a power grid.

8. The system of claim 1 wherein said flow path enables storing the heat of steam, where the steam for storage was withdrawn from the outlet of a high pressure turbine of a steam power plant after a reheater to reduce the pressure; the transfer of heat from said fluid to said medium resulting in heat storage.

9. An integrated coal gasification combined cycle power plant comprising the system of claim 1; the system of claim 1 providing the integrated coal gasification combined cycle power plant with better load following capability.

10. A coal fired steam power plant comprising the system of claim 1.

11. In a power plant, a method for heat storage for providing stored heat using a heat transfer fluid, the method comprising the steps of:

providing a ceramic heat storage medium having an extended longitudinal section extending along a longitudinal axis, said medium formed with particles, said particles cooperating and defining voids between said particles to facilitate flow of heat transfer fluid in said longitudinal direction, said voids combining to define a longitudinal flow path along said longitudinal axis through said medium, said particles and voids enabling flow of said fluid along a plane perpendicular to said axis laterally across said medium, said particles configured to limit particle-to-particle heat transfer, said particles configured to promote and having an affinity for direct transfer of heat with said fluid in said plane and thus defining a heat front along said plane, wherein said medium and fluid cooperate to transfer heat between said fluid and said medium along said plane to form said heat front perpendicular to said axis and along said plane, and said particles simultaneously resisting heat transfer by contact with each other and having an affinity for rapidly transferring heat by direct contact with said fluid, said flow path having a port for passing a working fluid, said flow path having a region at said port for storing the heat of said working fluid at a predetermined temperature after said flow is stopped; and providing a container for said medium, said container having a heat transfer fluid inlet and a heat transfer fluid outlet, placing at least one insulating layer in said longitudinal flow path separated from said inlet to define a compartment, said at least one insulating layer adapted to substantially prevent reduction of temperature gradient within said compartment; said at least one insulating layer having a porosity sufficient to allow the flow of heat transfer fluid along said flow path and out of said compartment, the transfer of heat from said working fluid to said medium, when said working fluid is provided through said heat transfer fluid inlet, resulting in heat storage.

12. The method of claim 11 further proving a flow controller, said controller controlling the flow rate of said fluid, wherein said rate is selected to ensure that said particles and said fluid along said plane arrive at the said predetermined temperature while in said plane, said flow path having a port for passing said heated fluid at said predetermined temperature, the vapor phase of said fluid being used as a working fluid in said system.

13. The method of claim 11 further providing a container for containing said medium and having a heat transfer fluid cool port and heat transfer fluid superheat port, said flow path having a superheat region and a boiling region, in the area of said cool port said flow path carrying said fluid as a liquid below said boiling temperature to said boiling region, said flow path storing the heat of said fluid as a superheated vapor at predetermined temperature in the area of said superheat port, and said flow path storing the heat of said fluid as a boiling liquid in said boiling region.

14. The method of claim 11 further providing said particles further including heat storage material and heat insulating material, further including periodic insulating porous layers of said insulating material in said flow path to prevent at said front the reduction of the temperature gradient by heat conduction through said particles.

15. The method of claim 13 further providing wherein the insulating layer is a plate with passages, said plate made of an insulating heat resistant material.

16. The method of claim 13 further providing wherein said insulating layer is a layer of insulating heat resistant particles similar in size to the heat conducting material.

17. The method of claim 11 further providing said flow path enables storing the heat of steam generated in a concentrating solar power plant, afterwards regenerating this steam by feeding water to the storage vessel, for delivery of said regenerated steam on demand.

18. The method of claim 11 further providing said flow path enables storing the heat of steam generated in a steam boiler of a combined cycle power plant whenever the steam is not needed to generate electricity thereafter using the steam stored whenever needed in a separate turbine providing thereby load following capability and storage to a combined cycle plant.

19. The method of claim 18 wherein said extra steam turbine is larger than a steam turbine of the plant itself and providing larger short term load following capability to use to stabilize a power grid.

20. The method of claim 11 further providing wherein said plant is an integrated coal gasification combined cycle power plant to provide it with better load following capability.

21. The method of claim 11 further providing wherein said plant is a coal fired steam power plant.

22. The method of claim 11 further providing wherein said flow path has the ability to store the heat of steam, where the steam for storage was withdrawn from the outlet of the high pressure turbine of a steam power plant after a reheater to reduce the pressure.

* * * * *